July 4, 1933.　　　V. A. KJAER　　　1,916,482
YIELDABLE GEARING
Filed Aug. 5, 1931　　　3 Sheets-Sheet 1

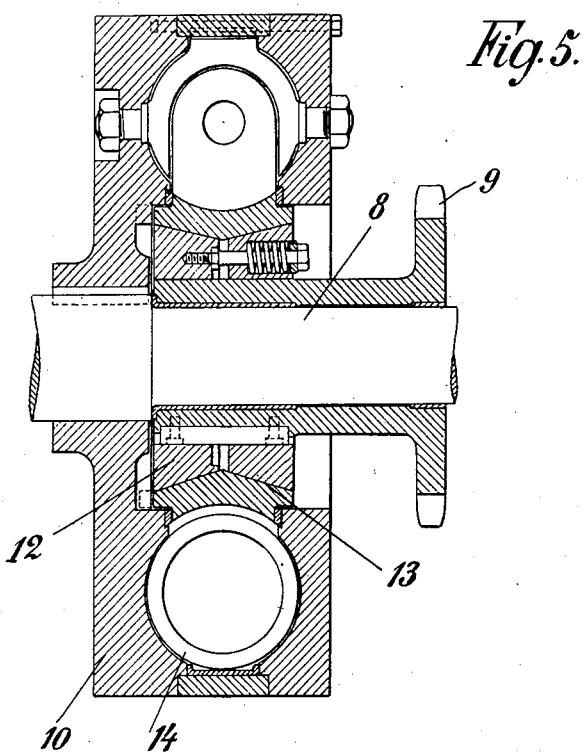
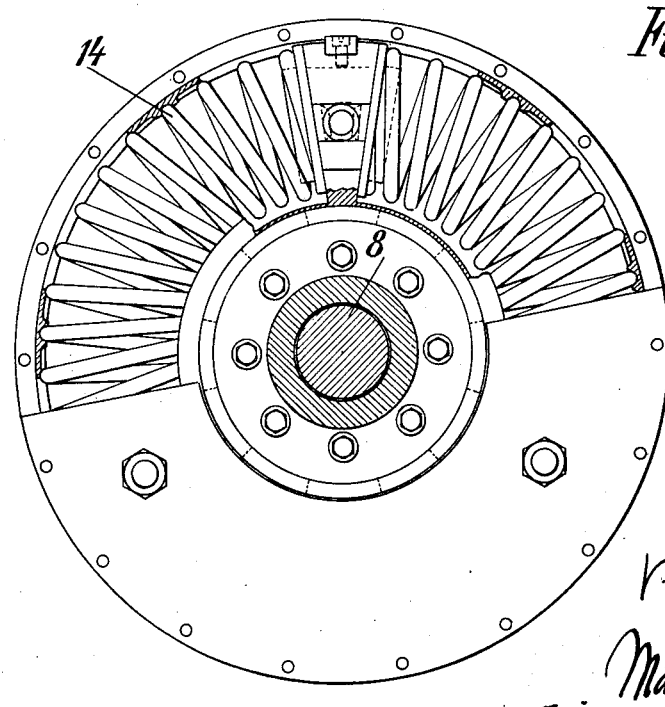

Patented July 4, 1933

1,916,482

UNITED STATES PATENT OFFICE

VIGGO AXEL KJAER, OF COPENHAGEN, DENMARK

YIELDABLE GEARING

Application filed August 5, 1931, Serial No. 555,352, and in Denmark September 4, 1930.

Figure 1:
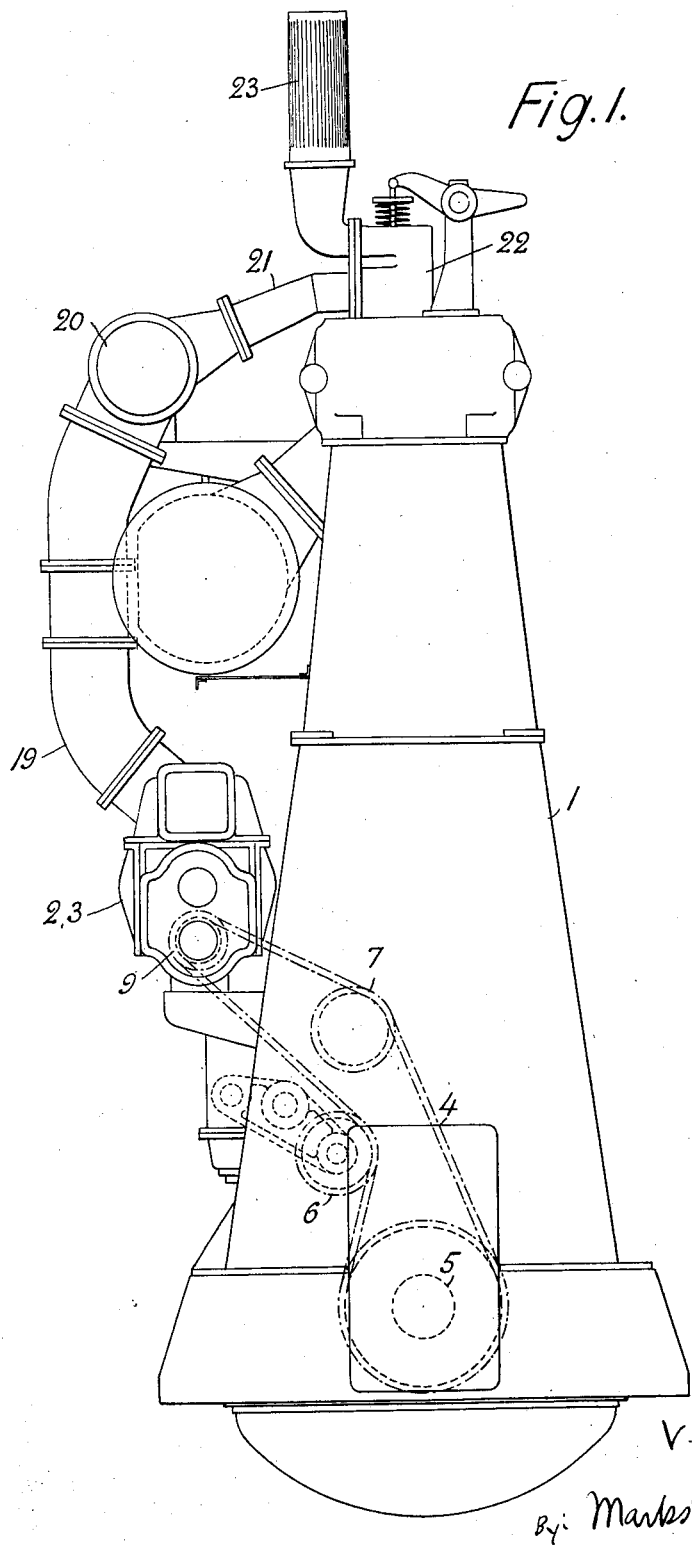
Figure 2:
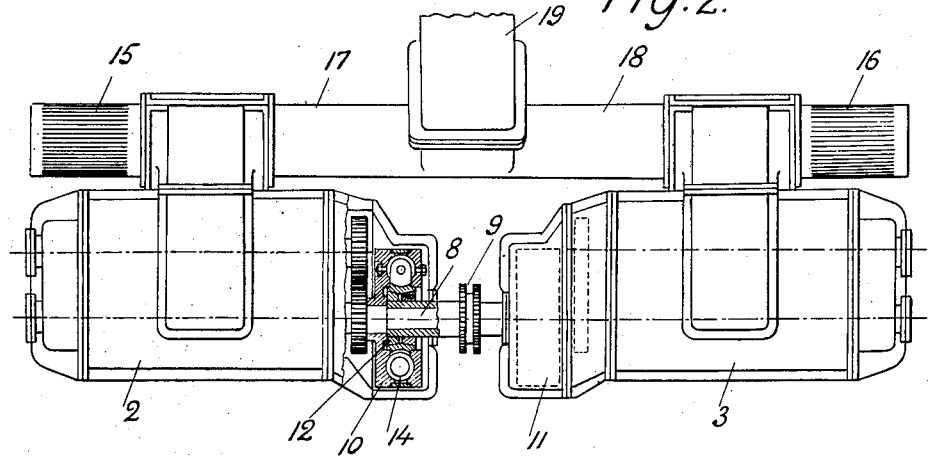
Figure 3:
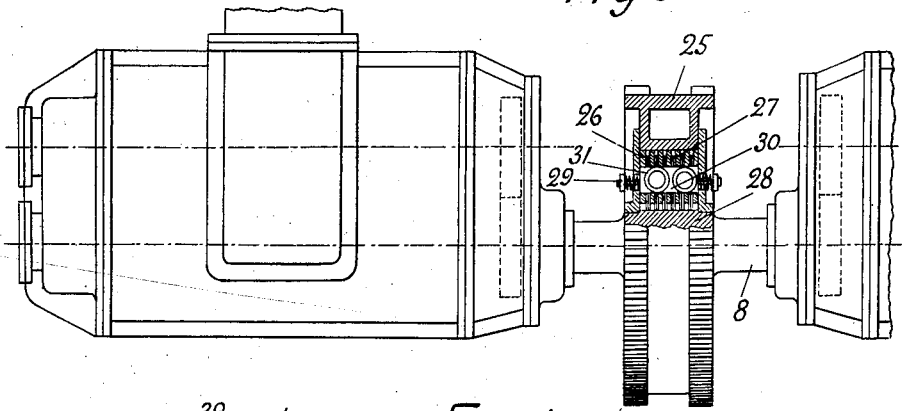
Figure 4:
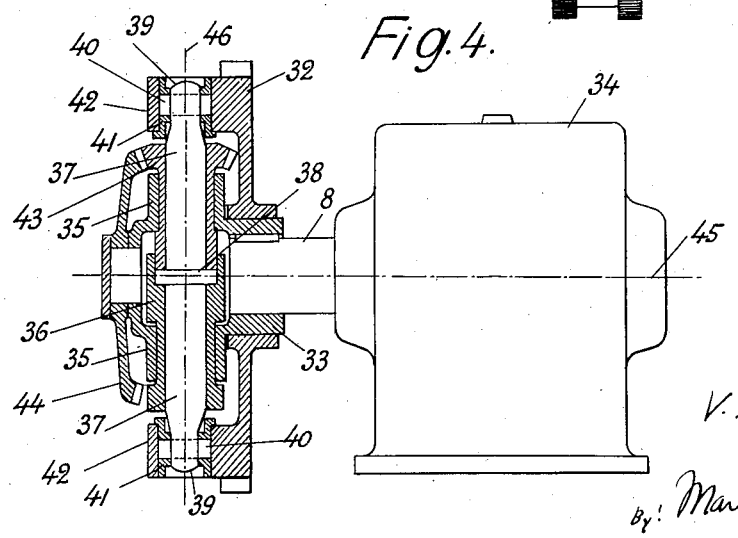

My invention relates to an improvement in chain gearings serving to transfer energy from one shaft to another, one or both of which rotate with a certain irregularity, and particularly chain gearings for internal combustion engines. The said irregularity of the rotation results in the first place in the raising of additional tensions in the chain and in the second place therein that the masses driven by the chain may be put into vibrations owing to the impulses rising from the irregularity, whereby the said masses may exert an injurious effect on the chain itself. The invention has for its object an arrangement by which the chain is saved the said influences. Regarding the stretched part of the chain between two chain wheels, it is evident that the chain part has got a certain prolongation beyond its normal length owing to the influence from the pull at the chain part effecting the transfer of the energy. When the driving chain wheel rotates with a certain irregularity, the prolongation of the chain part must vary, and it will be alternately greater or less than the prolongation corresponding to the mean value of the turning momentum. Two different cases may be supposed. One case is that the motion of the chain corresponds chiefly to the motion of the driving chain wheel so that it takes place practically without natural vibrations. In this case the motion can be calculated when the degree of irregularity, the number of revolutions and the diameter of the chain wheel are known, and it will often be possible to so dimension the chain that it is able to bear the tensions. Cases occur, however, where the dimensions of chains in the market do not suffice for the tensions which may occur. It has to be remarked particularly that increasing the strength of the chain means at the same time increasing its weight and, consequently, the inertia effects rising from the irregularity. In the other case longitudinal vibrations occur in the chain parts in addition to the above mentioned motion so that the parts are alternately prolonged and shortened, and if the impulses caused by the irregularity have a frequency which is in resonance with the natural vibration frequency of the chain, the prolongation of the chain can surpass the allowed value. In an internal combustion engine it cannot be avoided, because its number of revolutions must often vary between wide limits, that vigorous vibrations occur in a chain driven from the crank shaft of the engine, if particular measures are not provided. In order to facilitate the understanding of the way in which the rising of vibrations is neutralized according to the invention, the expression "reduced length" used in the following is first to be explained. If a compound system has to be calculated for torsional vibrations this is preferably made by comparing each individual part of the system with an imaginary shaft having a determined diameter, while its length depends on the rigidity of the part in question, viz so that a torsional momentum (e. g. 1 kgm.) influencing the imaginary shaft in its end faces would give a torsional angle to the shaft equal to the angle which the part of the system would be twisted under the influence of the same momentum. As the prolongation or shortening of a chain part causes a mutual turning of the driving and driven chains, it will be evident that as regards its longitudinal vibrations the chain part may be replaced by an imaginary shaft portion, the length of which serves to compare the rigidity of the chain with the rigidity of the other parts of the system, which are also supposed to be replaced by shaft portions having the same diameter. The length of the shaft portion equivalent to the tightened chain part as to the vibrations is designated hereafter as the reduced length of the chain, and similarly the length of the imaginary shaft portions replacing the other parts of the system is called the reduced length of the parts in question. Regarding now a shaft portion upon which a motion having a certain irregularity is imposed at one end, and at the other end of which is placed a mass having the momentum of inertia I, this mass will cause a reaction at the first mentioned end appearing by calculation to be proportional chiefly to the rigidity of the shaft (fourth power of the diameter) and inversely proportional to the length of the shaft. Thus the reaction will be small when the length of the shaft portion is great, and consequently a long shaft portion causes dynamically seen a separation between the mass and the place where the motion is imposed to the shaft portion. Now the invention resides therein that by means of an elastic member having a great reduced length the chain is separated either from the driving shaft or from the driven shaft (or from both), or, in other words, that an elastic member having a greatly reduced length relatively to the reduced length of the chain is inserted in one or both of the shafts. When the elastic member is inserted in the driving shaft, the above mentioned momentum of inertia I becomes equal to the momentum of inertia of the chain with its chain wheels, the driven shaft and the masses rotating therewith, whereas when the elastic member is inserted in the driven shaft I becomes only the momentum of inertia of the masses driven by the chain. By this arrangement is obtained that the chain either is separated (dynamically seen) from the shaft that rotates with irregularity and is, therefore, a source of vibration creating impulses, or is separated from the rotating masses which may cause injurious reactions when they are made to vibrate. Even if the device according to the invention reduces thus the vibration creating impulses influencing the chain, care must, however, preferably be taken that the natural vibration frequency of the whole system does not harmonize with the impulses, which may e. g. be obtained by correctly dimensioning the chain gearing with the elastic member and the rotating parts. It can, however, also be obtained thereby that instead of having a constant reduced length the elastic member is so arranged that its reduced length varies periodically but in such way that the greatest value of the reduced length is great in relation to the reduced length of the chain. Hereby is obtained first that the rotating masses driven through the elastic member do not get any distinct natural vibration frequency so that they are prevented from reacting on the chain with vibration creating impulses. Secondly is obtained that the whole system consisting of the chain and all rotating parts does not get any distinct natural vibration frequency. Beside the elastic member a friction clutch is preferably employed, the coacting coupling faces of which are so pressed together that slip occurs between them if the turning momentum exceeds a predetermined value determined under consideration of the strength of the clutch elements. The turning momentum is exceeded when the shaft or chain is subjected to vibrations which may arise, for instance, by reason of the whole system consisting of the chain and all rotating parts getting into vibrations, which does not, however, normally occur namely because of the employment of the elastic member according to the invention. As stated above, the invention is particularly applicable to internal combustion engines, especially such where the combustion air is previously compressed by means of a blower drawn directly from the crank shaft before being introduced in the engine cylinders. It is difficult to employ rapidly running blowers in slowly running internal combustion engines, as this would require a transmission between the crank shaft and blower shaft increasing highly the velocity and, consequently, also both the injurious effect of the irregularity of the crank shaft and the reaction of the blower rotor on the chain. Relatively slowly running blowers must, therefore be employed, the rotors of which have a relatively great extent and, in consequence thereof, a considerable weight. If the blower should be dimensioned so as to deliver the entire quantity of air consumed by the engine, the rotor would get so large dimensions that the construction of a chain gearing would cause considerable difficulties, even with the use of the invention. It is, therefore, very advantageous to use in such internal combustion engines, in combination with the chain gearing according to the invention, a particular suction valve by which it is possible only to employ compressed air to the scavenging of the cylinder and to the actual supercharging, air being besides sucked in directly from the atmosphere during the suction stroke. Hereby is obtained a reduction of the yielding of the blower with about 50% and of the dimensions, so that the blower can be driven directly from the crank shaft by a chain of reasonable dimensions. The invention is illustrated in the accompanying drawings whereon Fig. 1 shows a four-stroke internal combustion engine working with supercharge by means of a blower driven by a chain gearing according to the invention, the engine being represented in elevation as seen from one end, Fig. 2 is a side view of a part thereof, Fig. 3 is a fragmentary view similar to Fig. 2 of another constructional form of the invention, Fig. 4 illustrates a further construction of a device according to the invention, Fig. 5 is an enlarged detail sectional view of the clutch shown in Fig. 2, and Fig. 6 is a side view with part of the cover removed. In Figs. 1 and 2, the reference characters 2 and 3 designate two Roots' blowers supported on the framework 1 of the engine and driven from the main shaft 5 of the engine by means of a chain 4 which passes over a jockey pulley or tensioning roller 6 and a guide roller 7. The two blowers 2, 3 have a common shaft 8 provided with a chain wheel 9 around which the chain 4 is passed. At each end of the short common shaft 8 is fitted a spring clutch 10, 11, the clutch 10 for the blower 2 being shown in section in Fig. 2, while the clutch 11 for the blower 3 is shown in outline only by dotted lines. The clutches 10, 11 which are identical in construction consist of springs 14 and friction elements 12 and 13 having double conical friction surfaces which are pressed against each other with such a pressure that the power required to drive the blower can be transmitted by the coacting friction faces. According to the invention the springs 14 are so adjusted that their reduced length is great in relation to the reduced length of the chain. Furthermore the arrangement is preferably so that the natural vibration frequency of the entire system (crank shaft, chain, blower shafts and masses connected therewith) is not in resonance with the vibration creating impulses in the engine and so that there is no resonance between the aforesaid impulses and the natural vibration frequency of the chain 4, shaft 8 and rotors of the blowers 2, 3, the conditions being such that vibrations may possibly occur in the last mentioned system, without however requiring torsional vibrations to occur in the crank shaft. The cramping pressure between the coacting faces of the clutch parts 12, 13 is not greater than to allow slip between them, if the torsional momentum exceeds a predetermined value determined under consideration of the strength of the elements. This may occur when the engine works with numbers of revolutions differing from the normal one, as in this case there is a possibility of resonance between the vibration creating impulses and the natural vibration frequency of the system. The engine is furthermore so arranged that the blowers 2, 3 draw in air from the atmosphere through inlet cages 15, 16 and force the compressed air through branch pipes 17, 18 into a vertical collecting pipe 19 which opens at its top into a horizontal collecting pipe 20 from which branch pipes 21 lead to the inlet valves 22 of each cylinder. Part of the air charge is, however, directly drawn into the cylinders from the atmosphere through an inlet cage 23, compressed air being preferably only used for scavenging the cylinders and for supercharging them at the end of the suction stroke. This allows the blower to be far smaller dimensioned than would otherwise be necessary. In the constructional form shown in Fig. 3 the blower shaft 8 is driven by means of a double chain wheel 25 connected by a chain (not shown) with a chain wheel on the main shaft of the engine. The chain wheel 25 is constructed in the form of a loose toothed ring, the inner cylindrical face of which is provided with grooves which engage a set of laminated plates 26. Between these is inserted another set of laminated plates 27 attached by corresponding notches and ribs to the hub 28 of the chain wheel. The laminated plates 26, 27 are pressed together by means of coil springs 29, a suitable number being distributed over the outer surface of the plates which are besides provided with a number of recesses 30 for the reception of springs 31. The device operates as follows: Vibrations in the chain cause slip between the two sets of laminated plates 26, 27 and by this means part of the vibration energy is transformed into frictional work, heat being generated by the relative slip between the laminated plates. The springs 31 are compressed, when the laminated plates 26, 27 are displaced relative to each other, and absorb thereby another part of the vibration energy, and on their subsequent expansion the energy stored up during their compression is given up to the laminated plates, thus absorbing the energy in the form of frictional work. The vibrations imparted to the clutch and absorbed thereby may be either local vibrations set up in the chain by the impulses in the engine or they may be caused by torsional vibrations in the crank shaft, transmitted through the chain. In Fig. 4, 34 is a dynamo, the shaft 8 of which is driven from the main shaft of the engine by means of a chain and chain wheel 32. This chain wheel is rotatably fitted on a hub 33 keyed on the shaft 8. This hub is fixed to two bearings 35 in which a hollow shaft 36 is fitted, this shaft being at right angles to the shaft 8. In the interior of the shaft 36 is a blade spring 37 which is provided centrally with a collar 38 which is fixed in the hollow shaft 36 by being clamped between the two parts of which the shaft 26 is composed. The blade spring 37 has at each end an eye 39 which by means of pins 40 is fixed to bushes 41 which are rotatably fitted in bearings 42 on the chain wheel 32. The hollow shaft 36 carries at one end a bevel pinion 43 engaging with a fixed bevel wheel 44 coaxial with the dynamo shaft 8. This clutch operates as follows. The bearings 42 carry the bushes 41 and thus the blade spring 37 with them when the chain wheel 32 is set in rotation by means of the chain gearing. Thereby the pinion 43 rolls on the fixed bevel wheel 44 and the blade spring 37 therefore receives, beside motion about the axis of rotation 45 of the dynamo, a movement of rotation about its own longitudinal axis 46. The angle between the plane of the blade spring and the axis of rotation 45 therefore varies constantly so that the power transmitted from the chain wheel to the dynamo shaft 8 through the blade spring 37, bearings 35 and hub 33 is transmitted through a clutch member of constantly varying rigidity, its rigidity being greatest when the plane of the blade spring is at right angles to the axis of rotation 45 and smallest when the said plane passes through the said axis. Besides, the reduced length of the blade spring is so adjusted that its maximum value is great in relation to the reduced length of the chain. By this arrangement of the clutch the chain, dynamo shaft, parts rotating therewith and the crank shaft with the parts rotating therewith are prevented from attaining a constant natural vibration frequency which might be in resonance at certain speeds with the vibration creating impulses. On the contrary, the natural vibration frequency constantly varies so that the system cannot be set in vibration to a critical extent. The invention is not restricted to the shown and specified constructions which are only given as examples.

I claim:

1. A yieldable gearing provided with means for dampening vibrations, comprising a driving member having a hub, an overload release mechanism mounted on said hub, the said mechanism comprising a plurality of concentric frictional elements provided with downwardly inclined contacting faces, the outermost of said elements carrying radially disposed abutments, a driven member including a housing surrounding said abutments, the said housing being oscillatably mounted on said outermost member, and resilient instrumentalities interposed between said abutments and connecting the same to said housing.

2. A yieldable gearing comprising a driving member having a hub, a slip coupling mounted on said hub, the said coupling comprising a plurality of superposed frictional elements provided with downwardly inclined contacting faces, the outermost of said elements having radially disposed abutments, means for adjusting the frictional contact between said faces, a driven member including a housing surrounding said abutments, the said housing being oscillatably mounted on said outermost member, and resilient vibration dampening means interposed between said abutments and connecting the same to said housing.

In testimony whereof I affix my signature.

VIGGO A. KJAER.